(No Model.)

T. W. BOIES.
STOCK WATERING TROUGH.

No. 330,088. Patented Nov. 10, 1885.

WITNESSES:

INVENTOR: T. W. Boies

BY Munn & Co.
ATTORNEYS.

UNITED STATES PATENT OFFICE.

THADDEUS W. BOIES, OF BELOIT, KANSAS.

STOCK-WATERING TROUGH.

SPECIFICATION forming part of Letters Patent No. 330,088, dated November 10, 1885.

Application filed June 17, 1885. Serial No. 168,960. (No model.)

*To all whom it may concern:*

Be it known that I, THADDEUS W. BOIES, of Beloit, in the county of Mitchell and State of Kansas, have invented a new and useful Improvement in Stock-Watering Troughs, of which the following is a full, clear, and exact description.

Reference is to be had to the accompanying drawings, forming a part of this specification, in which similar letters of reference indicate corresponding parts in all the figures.

Figure 1:
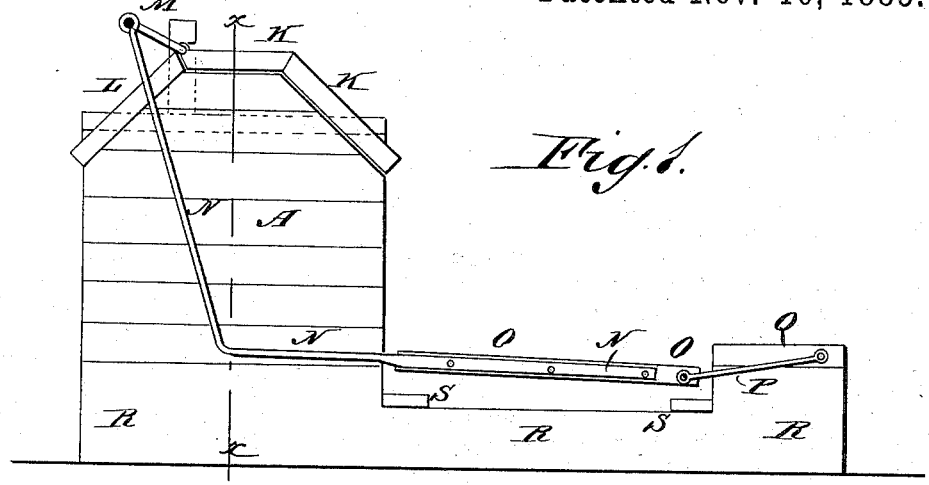
Figure 2:
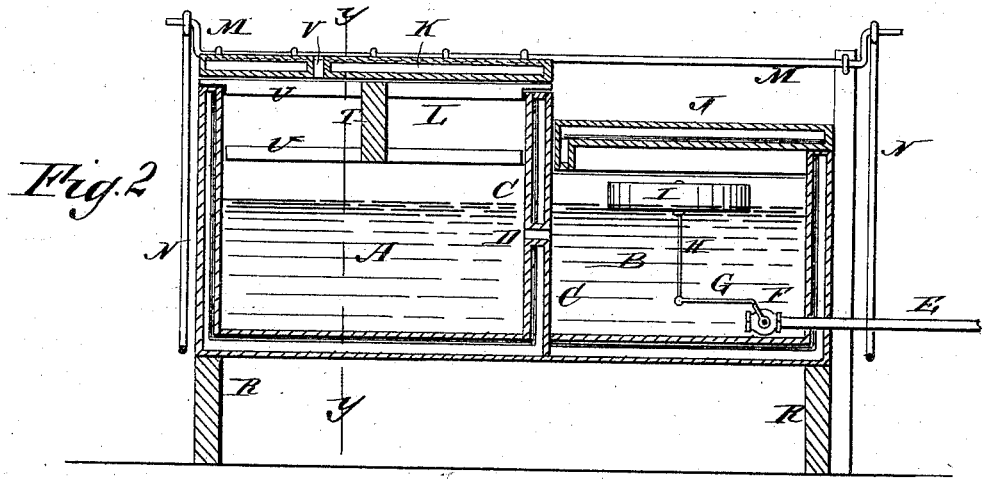
Figure 3:
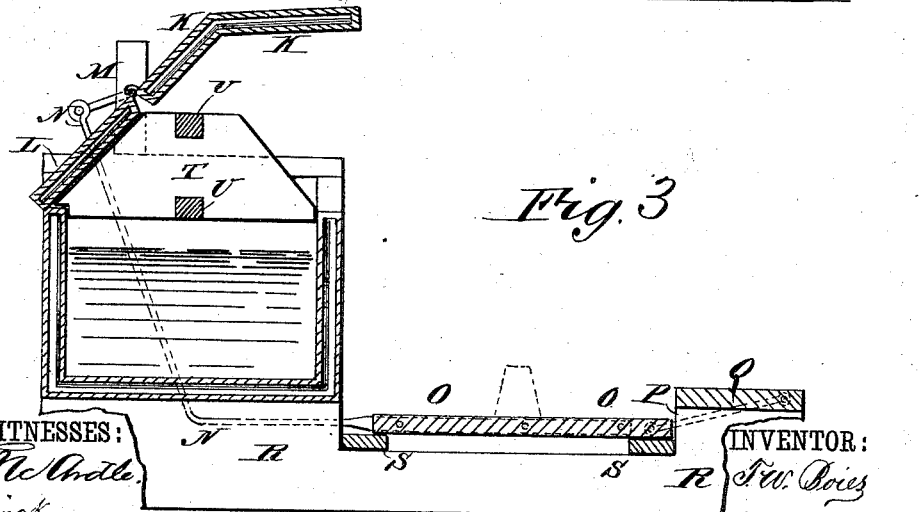

Figure 1 is a side elevation of one of my improved troughs. Fig. 2 is a sectional front elevation of the same, taken through the line $xx$, Fig. 1. Fig. 3 is a sectional side elevation of the same, taken through the line $yy$, Fig. 2.

The object of this invention is to provide troughs, for watering hogs and other animals, which shall be constructed in such a manner that they will be kept full automatically, will prevent the water from freezing, will be uncovered by the weight of the animal coming for drink, and will be covered automatically when the animal retires.

The invention consists in the construction and combination of various parts of the trough, as will be hereinafter fully described, and then claimed.

The trough is divided into two compartments, A B, by a partition, C, which has an opening, D, formed through it for the passage of water, so that the water will stand at the same height in both compartments. Water is introduced into the compartment B from a tank or other water-reservoir through the inlet-pipe E, the end of which within the said compartment B is provided with a stop-cock, F. To the plug of the stop-cock F is attached a crank-arm, G, to the outer end of which is pivoted the lower end of a rod, H. To the upper end of the rod H is attached a float, I, of sufficient buoyancy to close the stop-cock F by its rise, and of sufficient weight to open the said stop-cock F by its descent, so that the water in the trough A B will be kept at about the same level automatically. The compartment B is provided with a stationary cover, J. The compartment A is provided with a cover, K, hinged at its rear edge to the upper edge of the rear wall of the trough, or to a narrow stationary portion, L, attached to the rear part of the top of the said trough. To the cover K, at or near its hinged edge, is rigidly attached a crank-rod, M, to the crank-arms of which, at the ends of the trough A B, are pivoted the upper ends of two rods, N. The rods N extend downward with a forward inclination, or vertically, to nearly the level of the bottom of the trough A B, and are then bent forward into a horizontal position, and their forward parts are rigidly attached to the side edges of a platform, O. To the rear corners of the platform O are pivoted the inner ends of two short rods, P, the outer ends of which are pivoted to the ends of a stationary platform, Q, attached to the upper sides of the outer ends of the sills R, that support the trough A B. The sills R are recessed beneath the platform O to allow the said platform to have an up-and-down movement. To the sills R, at the inner and outer ends of their recesses, are attached cross-bars S, upon which the platform O rests when pressed down. The platform O can be so arranged as to be a little below or at the same level as the stationary platform Q. The relative weights of the hinged cover K and the platform O should be such that when left free the said cover K will drop into place upon the top of the compartment A of the trough and raise the platform O to its highest position. With this construction, if a hog or other animal steps upon the platform O, the weight of the said animal will lower the said platform O and raise the cover K, so that the animal can have free access to the water in the compartment A of the trough. As the animal steps from the platform O, the cover K and the said platform return to their normal position, so that the said trough will always be covered except when an animal is drinking out of it, and the water will be kept from being defiled by rubbish getting into it. In the upper part of the compartment A is placed a rack, which is formed of a cross-plate, T, shaped at its upper side to fit against the inner surface of the cover K. The ends of the cross-plate T rest in recesses in the front and rear walls of the trough. To the plate T are attached two or more bars, U. The ends of the upper bar U, or tenons formed upon the upper parts of the said ends, rest in notches in the upper edge of the end of the trough and of the partition C. The ends of the lower bar or bars U rest against the adjacent sides of the end of the trough and of the partition C. With this construction the rack T U prevents the animals from putting their feet in the trough and defiling the water, and at the same time the rack can be conveniently removed for convenience in cleaning out the trough. The sides, ends, and bottom of the trough A B, the partition C, and the covers J K L are all made with double walls, and in the spaces within the said walls are placed layers of pasteboard or other suitable material that is a non-conductor of heat, so that the water in the trough will be protected from freezing even in the coldest weather. Another advantage of this construction is that the inflow of water is fully controlled by the height of the water in the trough, so that there can be no overflow or waste of water, which is an important consideration in sections of country where water is scarce and obtained with difficulty. A small aperture, V, is formed through the cover K to allow any vapor that may rise from the water to escape.

Having thus fully described my invention, I claim as new and desire to secure by Letters Patent—

1. In a stock-watering trough, the combination, with the trough A B, the hinged cover K, the recessed sills R, and the stationary platform Q, of the crank-rod M, attached to the said hinged cover K, the bent connecting-rods N, pivoted to the arms of the said crank-rod, the platform O, attached to the said connecting-rods, and the pivoted rods P, connecting the movable and stationary platforms, substantially as herein shown and described, whereby the said hinged cover will be raised by the weight of an animal stepping upon the said movable platform, as set forth.

2. In a stock-watering trough, the combination, with the compartment A, having its walls recessed, and provided with the cover K and the recessed partition C, of the removable rack consisting of the plate T and the bars U, the upper one having tenons on its ends, substantially as herein shown and described.

3. In a stock-watering trough, the combination, with a receptacle having a hinged cover, of a vertically-movable platform, and intermediate mechanism for opening and closing the cover of the receptacle by the up-and-down movement of the platform, substantially as and for the purpose set forth.

4. A watering-trough for stock, consisting of two compartments, one of the compartments having a hinged cover, a float in one of the said compartments for automatically opening and closing the supply-pipe projecting into the compartment, a vertically-movable platform, and means for opening and closing the cover of the compartment by the movement of the platform, whereby provision is made for automatically supplying water to the trough and opening and closing the cover of the same, as set forth.

THADDEUS W. BOIES.

Witnesses:
W. A. STEVENS,
W. S. JOHNSON.